(12) United States Patent
Pinkovezky et al.

(10) Patent No.: US 10,284,680 B2
(45) Date of Patent: May 7, 2019

(54) ORGANIZATION TARGETED STATUS UPDATES

(71) Applicant: Microsoft Technology Licensing, LLC, Redmond, WA (US)

(72) Inventors: Aviad Pinkovezky, Los Altos, CA (US); Huining Feng, Cupertino, CA (US); Hong H. Tam, Fremont, CA (US); Eldo K. Cherian, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/707,867

(22) Filed: Sep. 18, 2017

(65) Prior Publication Data

US 2018/0007163 A1 Jan. 4, 2018

Related U.S. Application Data

(63) Continuation of application No. 14/523,617, filed on Oct. 24, 2014, now Pat. No. 9,787,797.

(51) Int. Cl.
*G06F 15/16* (2006.01)
*H04L 29/08* (2006.01)
(Continued)

(52) U.S. Cl.
CPC .......... *H04L 67/306* (2013.01); *H04L 12/185* (2013.01); *H04L 12/1822* (2013.01);
(Continued)

(58) Field of Classification Search
CPC ....... H04L 67/306; H04L 67/20; H04L 67/02; H04L 67/22; H04L 12/1822; H04L 12/185; H04L 51/14; H04L 51/32
See application file for complete search history.

(56) References Cited

U.S. PATENT DOCUMENTS 8,756,278 B2    6/2014    Sittig et al.
9,886,727 B2 *   2/2018    Curtis .................... G06Q 50/01
(Continued)

OTHER PUBLICATIONS

Andrea Vahl, "How to Use Facebook Targeted Posts to Imrpove Your Facebook Engagement" Sep. 25, 2012, Social Media Examiner, pp. 1-6 (Year: 2012).*

(Continued)

*Primary Examiner* — Jonathan A Bui

(74) *Attorney, Agent, or Firm* — Schwegman Lundberg & Woessner, P.A.

(57) ABSTRACT

A social networking server receives a request from a member of an organization to configure a targeted update for the organization. The targeted update may be intended for a particular group of members of a social network service. The social networking server may provide various follower dimensions to associate with the targeted update, where each of the follower dimensions include one or more selectable attributes. When the social networking server receives a request for an organization's webpage from a member of the social network service, the social networking server may compare member attributes of a member profile associated with the member with the follower dimension attributes associated with the targeted update. The social networking server may provide the targeted update for display with the webpage of the organization based on the member attributes satisfying at least one follower dimension attribute associated with the targeted update.

20 Claims, 15 Drawing Sheets

(51) Int. Cl.
*H04L 12/18* (2006.01)
*H04L 12/58* (2006.01)

(52) U.S. Cl.
CPC .............. *H04L 51/14* (2013.01); *H04L 51/32* (2013.01); *H04L 67/20* (2013.01); *H04L 67/02* (2013.01); *H04L 67/22* (2013.01)

(56) References Cited

U.S. PATENT DOCUMENTS

| | | | |
|---|---|---|---|
| 2008/0065604 A1* | 3/2008 | Tiu ..................... | G06F 17/30569 |
| 2010/0262918 A1* | 10/2010 | Angell ................ | G06F 17/3089 |
| | | | 715/738 |
| 2010/0318426 A1 | 12/2010 | Grant et al. | |
| 2011/0184813 A1* | 7/2011 | Barnes .............. | G06F 17/30867 |
| | | | 705/14.66 |
| 2011/0258049 A1 | 10/2011 | Ramer et al. | |
| 2011/0288937 A1 | 11/2011 | Manoogian, III et al. | |
| 2012/0005224 A1* | 1/2012 | Ahrens .................. | H04W 4/21 |
| | | | 707/769 |
| 2012/0124176 A1* | 5/2012 | Curtis .................... | G06Q 50/01 |
| | | | 709/219 |
| 2012/0197980 A1* | 8/2012 | Terleski ................. | G06Q 50/01 |
| | | | 709/203 |
| 2013/0013700 A1 | 1/2013 | Sittig et al. | |
| 2014/0133530 A1 | 5/2014 | Maguire | |
| 2014/0143228 A1 | 5/2014 | Blue et al. | |
| 2014/0143323 A1 | 5/2014 | Posse et al. | |
| 2015/0012363 A1 | 1/2015 | Grant et al. | |
| 2015/0112765 A1 | 4/2015 | Sundaresh et al. | |
| 2015/0127748 A1* | 5/2015 | Buryak .................. | H04L 51/32 |
| | | | 709/206 |
| 2015/0229736 A1* | 8/2015 | Garg ..................... | H04L 67/306 |
| | | | 709/204 |
| 2015/0249716 A1 | 9/2015 | Chen et al. | |
| 2015/0256569 A1* | 9/2015 | Sathish .................. | G06Q 50/01 |
| | | | 709/204 |
| 2016/0036929 A1 | 2/2016 | Leal et al. | |
| 2016/0050289 A1* | 2/2016 | Cohen .................... | H04L 67/30 |
| | | | 709/204 |
| 2016/0119444 A1 | 4/2016 | Pinkovezky et al. | |

OTHER PUBLICATIONS

"U.S. Appl. No. 14/523,617, Corrected Notice of Allowance dated Jun. 20, 2017", 12 pgs.
"U.S. Appl. No. 14/523,617, Final Office Action dated Dec. 15, 2016", 12 pgs.
"U.S. Appl. No. 14/523,617, Non Final Office Action dated Jun. 6, 2016", 10 pgs.
"U.S. Appl. No. 14/523,617, Notice of Allowance dated May 30, 2017", 15 pgs.
"U.S. Appl. No. 14/523,617, Response filed Apr. 17, 2017 to Final Office Action dated Dec. 15, 2016", 14 pgs.
"U.S. Appl. No. 14/523,617, Response filed Oct. 6, 2016 to Non Final Office Action dated Jun. 6, 2016", 11 pgs.
"How to make a Facebook Newsfeed post only certain friends can see", The Facebook Detective, [Online]. Retrieved from the Internet: <https://thefacebookdetective.wordpress.com/2011/03/03/how-to-make-a-facebook-newsfeed-post-only-certain-friends-can-see>, (Mar. 3, 2011), 3 pgs.
"When I share something, how do I choose who can see it?", Facebook Help Center, [Online]. Retrieved from the Internet: <http://www.facebook.com/help/120939471321735>, (Oct. 19, 2012), 1 pg.
Grishaver, Mike, "Enabling More Relevant Conversations between Companies and Followers", http://blog.linkedin.com/2012/06/19/targeted-status-updates/, (Jun. 19, 2012), 3 pgs.

* cited by examiner

ORGANIZATION TARGETED STATUS UPDATES

CROSS-REFERENCE TO RELATED APPLICATIONS

This application claims the benefit of priority to U.S. patent application Ser. No. 14/523,617, titled "ORGANIZATION TARGETED STATUS UPDATES" and filed Oct. 24, 2014, the disclosure of which is hereby incorporated by reference in its entirety.

TECHNICAL FIELD

The subject matter disclosed herein generally relates to a system and method for providing targeted content to members of a social network service and, in particular, to a system and method for providing the targeted content within a webpage of an organization provided by the social network service such that the targeted content is displayed to selected members of the social network service.

BACKGROUND

A social network service may provide a platform for its various members and enrolled organizations to interact. In particular, when an organization enrolls with the social network service, the organization may be provided a webpage. The organization may then provide updates or other information of interest to members of the social network service via the webpage of the organization. However, when one member of the social network service visits the organization's webpage, not all of the updates or content displayed on the webpage will be relevant to him or her. In other words, updates and information provided by the organization may be relevant to different members, or groups of members, of the social network service. As an organization may provide numerous updates to its webpage, a member of the social network service visiting the webpage can be overwhelmed with the amount of information available. Furthermore, the member will be distracted by the amount of information available and will be unable to focus on the updates most relevant to him or her.

BRIEF DESCRIPTION OF THE DRAWINGS

Some embodiments are illustrated by way of example and not limitation in the figures of the accompanying drawings.

DETAILED DESCRIPTION

Figure 1:
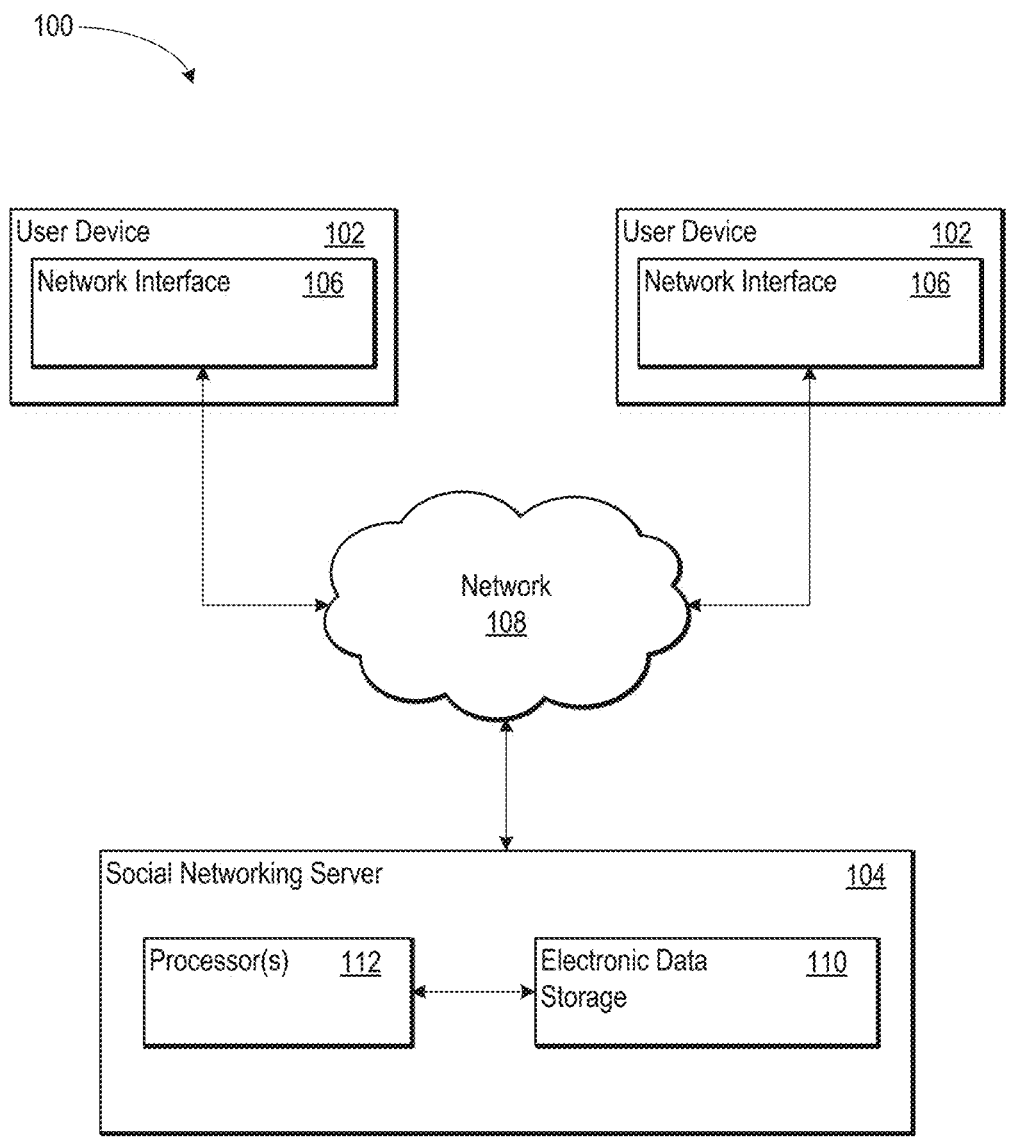
FIG. 1 is a block diagram of a system in accordance with an example embodiment, including user devices and a social networking server.

The disclosed systems and methods are directed to integrating targeted updates within a webpage provided by a social network service. The webpage may be maintained by an organization (e.g., a corporation, an interest group, a non-profit organization, etc.) and the organization may provide updates about items of interest that may be relevant to the organization via its webpage. The items of interest may include information about events, activities, products, news, people, or other such items of interest. The updates may be targeted such that individual updates are directed to certain segments of the members enrolled with the social network service. The technical effect of such targeting is that the updates are selectively displayable to the members of the social network service. In other words, a targeted update appearing on the webpage of the organization may not be viewable by every member that accesses the organization's webpage. The disclosed targeting mechanism has the further technical effect of streamlining the information a social networking server processes and provides in order to render the organization's webpage. Accordingly, the various technologies involved in the formation and display of a targeted update include, but are not limited to, graphical user interface development and design, network communications, database management and configuration, computer-executable scripting languages, and other such technologies.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one embodiment, this disclosure provides for a method that includes receiving a request from a member of an organization to provide a targeted update relevant to the organization, the targeted update comprising information of interest and intended for a particular plurality of members of a social network service, providing a plurality of follower dimensions to associate with the targeted update, each of the follower dimensions specifying an attribute to be possessed by one or more member profiles corresponding to the members of the particular plurality, associating a selection of the one or more attributes with the targeted update, receiving a request for a webpage from a member of a social network service, the webpage being associated with the organization, comparing member attributes of a member profile associated with the member of the social network service with the follower dimension attributes associated with the targeted update, and providing the targeted update for display with the webpage of the organization based on the member attributes satisfying at least one follower dimension attribute for each of the follower dimensions associated with the targeted update.

In another embodiment of the method, providing the targeted update for display with the webpage of the organization is in response to a determination that there is a targeted update to provide.

In a further embodiment of the method, the follower dimensions of the targeted update include a company size dimension identifying a company size, an industry dimension identifying an industry, and a functions dimension identifying a function performed by a member of the social network service.

In yet another embodiment of the method, the targeted update is selected from a plurality of targeted updates, wherein the follower dimension attributes of the selected targeted update are different from another set of follower dimension attributes for another targeted update selectable from the plurality of targeted updates.

In yet a further embodiment of the method, at least one attribute of the targeted update indicates whether members of the organization are intended to receive the targeted update.

In another embodiment of the method, the method includes establishing a configurable element of the webpage of the organization, wherein the configurable element is associated with a plurality of selectively displayable versions of the configurable element, each version depending on the member attributes of the member profile, and providing a selected version of the plurality of selectively displayable versions of the configurable element for display within the webpage of the organization, the selected version being selected based on at least one member attribute of the member profile.

In a further embodiment of the method, the configurable element of the webpage of the organization comprises a defined portion of the webpage.

This disclosure also provides for a system that includes a non-transitory, computer-readable medium storing computer-executable instructions, and one or more processors in communication with the non-transitory, computer-readable medium that, having executed the computer-executable instructions, are configured to receive a request from a member of an organization to provide a targeted update relevant to the organization, the targeted update comprising information of interest and intended for a particular plurality of members of a social network service, provide a plurality of follower dimensions to associate with the targeted update, each of the follower dimensions specifying an attribute to be possessed by one or more member profiles corresponding to the members of the particular plurality, associate a selection of the one or more attributes with the targeted update, receive a request for a webpage from a member of a social network service, the webpage being associated with the organization, compare member attributes of a member profile associated with the member of the social network service with the follower dimension attributes associated with the targeted update, and provide the targeted update for display with the webpage of the organization based on the member attributes satisfying at least one follower dimension attribute for each of the follower dimensions associated with the targeted update.

In another embodiment of the system, the one or more processors provide the targeted update for display with the webpage of the organization in response to a determination that there is a targeted update to provide.

In a further embodiment of the system, the follower dimensions of the targeted update include a company size dimension identifying a company size, an industry dimension identifying an industry, and a functions dimension identifying a function performed by a member of the social network service.

In yet another embodiment of the system, the targeted update is selected from a plurality of targeted updates, wherein the follower dimension attributes of the selected targeted update are different from another set of follower dimension attributes for another targeted update selectable from the plurality of targeted updates.

In yet a further embodiment of the system, at least one attribute of the targeted update indicates whether members of the organization are intended to receive the targeted update.

In another embodiment of the system, he one or more processors are further configured to establish a configurable element of the webpage of the organization, wherein the configurable element is associated with a plurality of selectively displayable versions of the configurable element, each version depending on the member attributes of the member profile, and provide a selected version of the plurality of selectively displayable versions of the configurable element for display within the webpage of the organization, the selected version being selected based on at least one member attribute of the member profile.

In a further embodiment of the system, the configurable element of the webpage of the organization comprises a defined portion of the webpage.

This disclosure further provides for a non-transitory, computer-readable medium having computer-executable instructions stored thereon that, when executed by one or more processors, cause the one or more processors to perform a method, the method comprising receiving, with one or more processors, a request from a member of an organization to provide a targeted update relevant to the organization, the targeted update comprising information of interest and intended for a particular plurality of members of a social network service, providing a plurality of follower dimensions to associate with the targeted update, each of the follower dimensions specifying an attribute to be possessed by one or more member profiles corresponding to the members of the particular plurality, associating a selection of the one or more attributes with the targeted update, receiving a request for a webpage from a member of a social network service, the webpage being associated with the organization, comparing member attributes of a member profile associated with the member of the social network service with the follower dimension attributes associated with the targeted update, and providing the targeted update for display with the webpage of the organization based on the member attributes satisfying at least one follower dimension attribute for each of the follower dimensions associated with the targeted update.

In another embodiment of the non-transitory, computer-readable medium the follower dimensions of the targeted update include a company size dimension identifying a company size, an industry dimension identifying an industry, and a functions dimension identifying a function performed by a member of the social network service.

In a further embodiment of the non-transitory, computer-readable medium, the targeted update is selected from a plurality of targeted updates, wherein the follower dimension attributes of the selected targeted update are different from another set of follower dimension attributes for another targeted update selectable from the plurality of targeted updates.

In yet another embodiment of the non-transitory, computer-readable medium, wherein at least one attribute of the targeted update indicates whether members of the organization are intended to receive the targeted update.

In yet a further embodiment of the non-transitory, computer-readable medium, the method further includes establishing a configurable element of the webpage of the organization, wherein the configurable element is associated with a plurality of selectively displayable versions of the configurable element, each version depending on the member attributes of the member profile, and providing a selected version of the plurality of selectively displayable versions of the configurable element for display within the webpage of the organization, the selected version being selected based on at least one member attribute of the member profile.

In another embodiment of the non-transitory, computer-readable medium, the configurable element of the webpage of the organization comprises a defined portion of the webpage.

FIG. 1 is a block diagram of a system 100 in accordance with an example embodiment, including user devices 102 and a social networking server 104. In one embodiment, a particular type of social networking server 104 may be referred to as a business network server. User devices 102 may be a personal computer, netbook, electronic notebook, smartphone, or any electronic device known in the art that is configured to display web pages. The user devices 102 may include a network interface 106 that is communicatively coupled to a network 108, such as the Internet.

The social networking server 104 may be communicatively coupled to the network 108. The server 104 may be an individual server or a cluster of servers, and may be configured to perform activities related to serving a social networking service, such as storing social network information, processing social network information according to scripts and software applications, transmitting information to present social network information to users of the social network service, and receive information from users of the social network service. The server 104 may include one or more electronic data storage devices 110, such as a hard drive, optical drive, magnetic tape drive, or other such non-transitory, computer-readable media, and may further include one or more processors 112.

The one or more processors 112 may be any type of commercially available processors, such as processors available from the Intel Corporation, Advanced Micro Devices, Texas Instruments, or other such processors. Furthermore, the one or more processors 112 may be of any combination of processors, such as processors arranged to perform distributed computing via the server 104.

The social networking server 104 may store information in the electronic data storage device 110 related to users and/or members of the social network, such as in the form of user attributes corresponding to individual users of the social network. For instance, for an individual user, the user's attributes may include one or more profile data points, including, for instance, name, age, gender, profession, prior work history or experience, educational achievement, location, citizenship status, leisure activities, likes and dislikes, and so forth. The user's attributes may further include behavior or activities within and without the social network, as well as the user's social graph. In addition, a user and/or member may identify an association with an organization (e.g., a corporation, government entity, non-profit organization, etc.), and the social networking server 104 may be configured to group the user profile and/or member profile according to the associated organization. In this way, the various attributes for a given user may form a user profile, which may be used by the social networking server 104 to determine whether a targeted update (discussed below) is viewable by the given user.

The social networking server 104 may also store information in the electronic data storage device 110 related to one or more organizations. The information about an organization may include a name of the organization, offered products for sale, available job postings, organizational interests, forthcoming activities, articles of interest and the like. Furthermore, the social networking server 104 may provide a platform by which an organization may design a webpage and allow other users or members of the social network service to access such webpage. Using the social networking server 104, a member of the organization may publish or provide various items of interest to one or more members of the social networking server 104 via the provided webpage. The items of interest may include information about upcoming products and/or services provided by the organization, events being hosted by the organization, news that may be relevant to the organization, people that the organization would like others to know about, and other such items of interest. In one embodiment, members of the social networking service may subscribe to the postings of the organization such that a subscribing member (e.g., a "subscriber" or "follower") receives updated items of interest that the organization has published. Furthermore, the organization may recognize that not all members of the social network service will be subscribers or followers, the organization may provide updates (e.g., the items of interest) via the organization's webpage.

Moreover, as the organization understands that different members have different notions as to the types of information that are relevant, the organization may provide targeted updates to different members, or different groups of members, via the organization's webpage. In one embodiment, the organization chooses the types of members that can view the targeted update when they visit the organization's webpage. For example, the attributes of a member profile may map to various selectable dimensions for a targeted update, and the organization can select which of the selectable dimensions should be satisfied in order for a given member to view the targeted update.

The social networking server 104 may include one or more applications to provide the organization's webpage and to integrate one or more targeted updates into the webpage. These applications may include a publication application, an authoring application, and other such applications directed to the publication and dissemination of articles that may be of interest to members of the social networking server 104. The social networking server 104 may also provide other utilities and applications, such as a search utility to help members quickly find organizations in which they may be interested or to find articles about topics in which they may be interested.

The one or more applications of the social networking server 104 may execute in real-time or as a background operation, such as offline or as part of a batch process. In some examples that incorporate relatively large amounts of data to be processed, the one or more applications may execute via a parallel or distributed computing platform.

Figure 2:
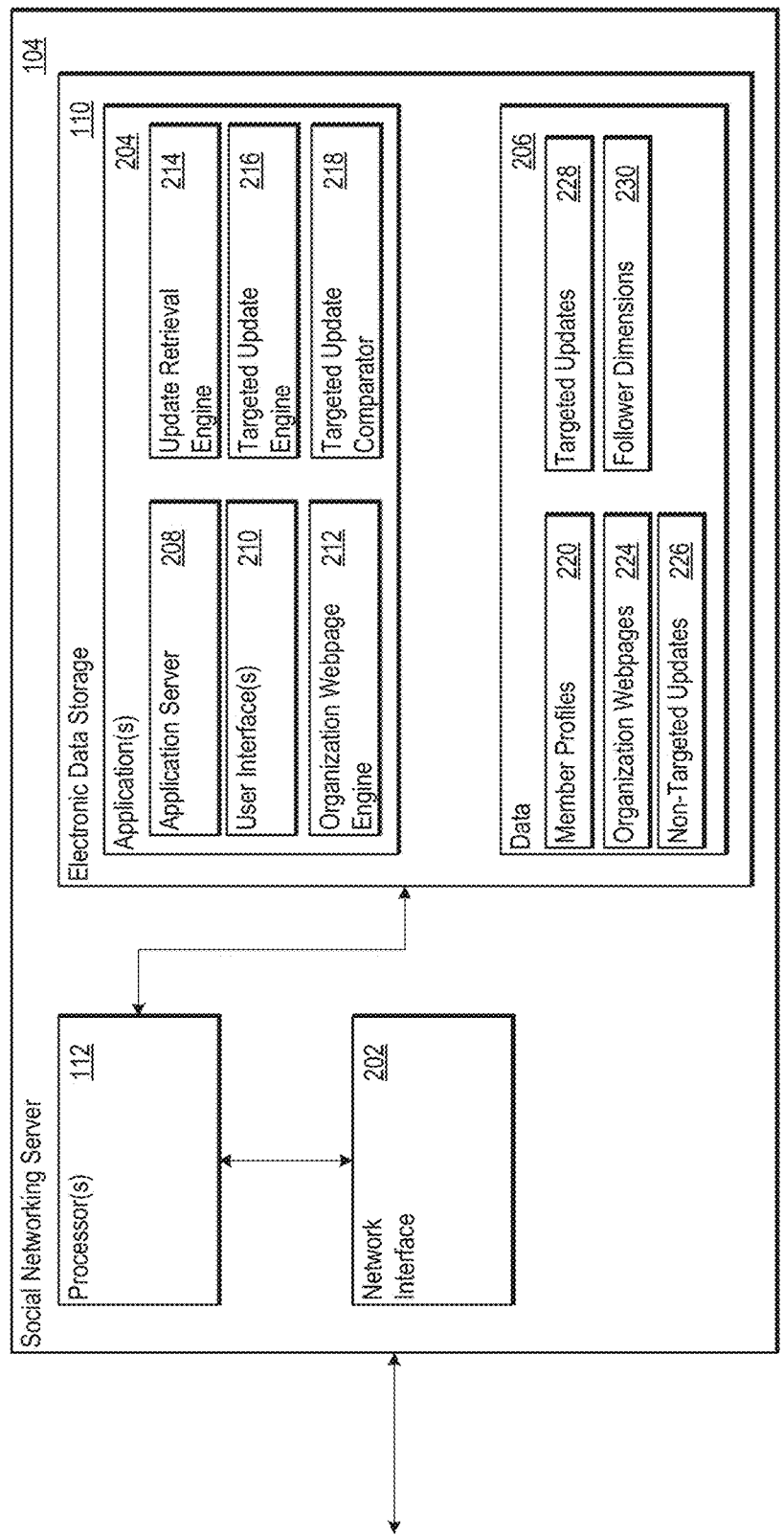
FIG. 2 is a block diagram illustrating various components of a social networking server in accordance with an example embodiment.

As discussed above, the social networking server 104 may facilitate providing targeted updates to selected members of the social network service via the webpage of an organization. FIG. 2 is a block diagram illustrating various components of a social networking server 104 in accordance with an example embodiment. In one embodiment, the social networking server 104 may include one or more processor(s)

112, one or more network interface(s) 202, one or more application(s) 204, and data 206 used by the one or more application(s) 204 stored in the electronic data storage 110.

As is understood by skilled artisans in the relevant computer and Internet-related arts, application(s) 204 shown in FIG. 2 may represent a set of executable software instructions and the corresponding hardware (e.g., memory and processor) for executing the instructions. To avoid obscuring the subject matter with unnecessary detail, various applications that are not germane to conveying an understanding of the inventive subject matter have been omitted from FIG. 2. However, a skilled artisan will readily recognize that various additional applications, engines, modules, etc., may be used with a social networking server 104 such as that illustrated in FIG. 2, to facilitate additional functionality that is not specifically described herein. Furthermore, the various applications depicted in FIG. 2 may reside on a single server computer, or may be distributed across several server computers in various arrangements.

The social networking server 104 may also include data 206, which may include one or more databases or other data stores that support the functionalities of the applications 208-218. In particular, data 206 may include one or more member profiles 220, various webpages of one or more organizations 224, targeted updates 228 and non-targeted updates 226, and follower dimensions 230, which may have one or more selectable attributes that can be associated with the targeted updates 228. While shown as being housed in the same box as application(s) 204, it should be understood that data 206 may be housed in another location or across locations (e.g., in a distributed computing environment).

The front end of the social networking server 104 may be provided by one or more user interface application(s) 210, which may receive requests from various client computing devices (e.g., user devices 102), and may communicate appropriate responses to the requesting client devices. For example, the user interface application(s) 210 may receive requests in the form of Hypertext Transport Protocol (HTTP) requests, or other web-based, application programming interface (API) requests. An application server 208 working in conjunction with the one or more user interface application(s) 210 may generate various user interfaces (e.g., web pages) with data retrieved from various data sources stored in the data 206. In some embodiments, individual application(s) (e.g., applications 208-218) may be used to implement the functionality associated with various services and features of the system 100.

In one embodiment, the application(s) 204 include an organization webpage engine 212. The organization webpage engine 212 may provide an organization's webpage via the application server 208 to one or more requesting devices. The organization webpage engine 212 may generate the organization's webpage using one or more scripting languages (e.g., JavaScript, Perl, PHP, etc.) and by retrieving data stored in one or more memory storage devices (e.g., data 206). For example, the organization webpage engine 212 may retrieve a webpage template or other resources from the organization webpages 224 stored in the data 206 and, working in conjunction with other applications(s) 204 (e.g., the targeted update engine 216 or the update retrieval engine 214) may prepare a webpage for sending to a requesting device that includes various static elements (e.g., an image, a hyperlink, text, etc.) and dynamic elements (e.g., sound, video, JavaScript objects, etc.). Furthermore, one or more of the static elements (e.g., text, graphics, etc.) may have been generated from a dynamic element. The generated webpage may also include one or more of the targeted updates retrieved from the targeted updates 228 by the update retrieval engine 214. As discussed above, the targeted updates 228 may be directed to different members of the social network service, which, ultimately, results in different versions of the same webpage being delivered to different members depending on which targeted updates are incorporated into the delivered webpage. Thus, the organization webpage engine 212 also facilitates the generation and delivery of these different webpages.

The application(s) 204 may further include an update retrieval engine 214. The update retrieval engine 214 may be configured to determine whether an update (targeted or otherwise) is available for incorporation into the organization's webpage delivered to a requesting device (e.g., by the organization webpage engine 212). In one embodiment, the organization webpage engine 212 may invoke the update retrieval engine 214 to determine whether a targeted update is available. The update retrieval engine 214 may then query the data 206, such as the non-targeted updates data store 226 or the targeted updates data store 228, to determine whether such update is available. Whereas a targeted update may be associated with various follower dimensions 230 indicating the type of member that should receive the targeted update, a non-targeted update may not be associated with such follower dimensions (e.g., a non-targeted update is available to any type of member).

However, both the non-targeted and/or targeted updates 226,228 may be associated with non-member dimensions, such as an expiration dimension (e.g., how long is the update available for viewing), a frequency dimension (e.g., how frequently is the update displayable), or other such non-member dimensions. In one embodiment, the update retrieval engine 214 may retrieve targeted updates 228 and non-targeted updates 226 available from a particular date and/or time. In another embodiment, the update retrieval engine 214 retrieves a given number and/or percentage of targeted updates 228 and/or non-targeted updates 226 for incorporation into the organization webpage.

Further still, the update retrieval engine 214 may invoke a targeted update comparator 218 to determine whether a given targeted update is to be incorporated into the delivered webpage. The targeted update comparator 218 may be configured to compare member attributes retrieved from one or more member profiles 220 with one or more follower dimensions 230 associated with the targeted update. As discussed below, the follower dimensions 230 associated with a given targeted update may indicate the type of member that should be shown the targeted update within the organization's webpage. Based on the comparison, the targeted update comparator 218 may inform the update retrieval engine 214 whether a given targeted update is to be incorporated into the organization's webpage delivered to the requesting device (e.g., a member requesting the organization's webpage).

The application(s) 204 may further include a mechanism for an organization to create and/or establish targeted updates. In particular, the application(s) 204 may include a targeted update engine 216, which may be configured to establish the parameters used in serving a targeted update. The targeted update engine 216 may also be configured to monitor and/or record metrics associated with a given targeted update to determine the effectiveness of such update. These metrics may include, but are not limited to, the number of members that were served the targeted update (e.g., impressions), the number of times members selected (e.g., clicked) the targeted update, the number of times members indicated approval or agreement (e.g., "liked") the targeted update, the number of comments received for the targeted update, and other such metrics. The targeted update engine 216 may further determine an effectiveness rating (e.g., an engagement percentage) for the targeted update that indicates a percentage or number of users that performed an action in response to the targeted update (e.g., viewed, clicked, commented, liked, etc.). The organization may use an effectiveness rating to help shape further targeted updates or to help gauge the amount of interest members of the social network service have in the organization.

Figure 3:
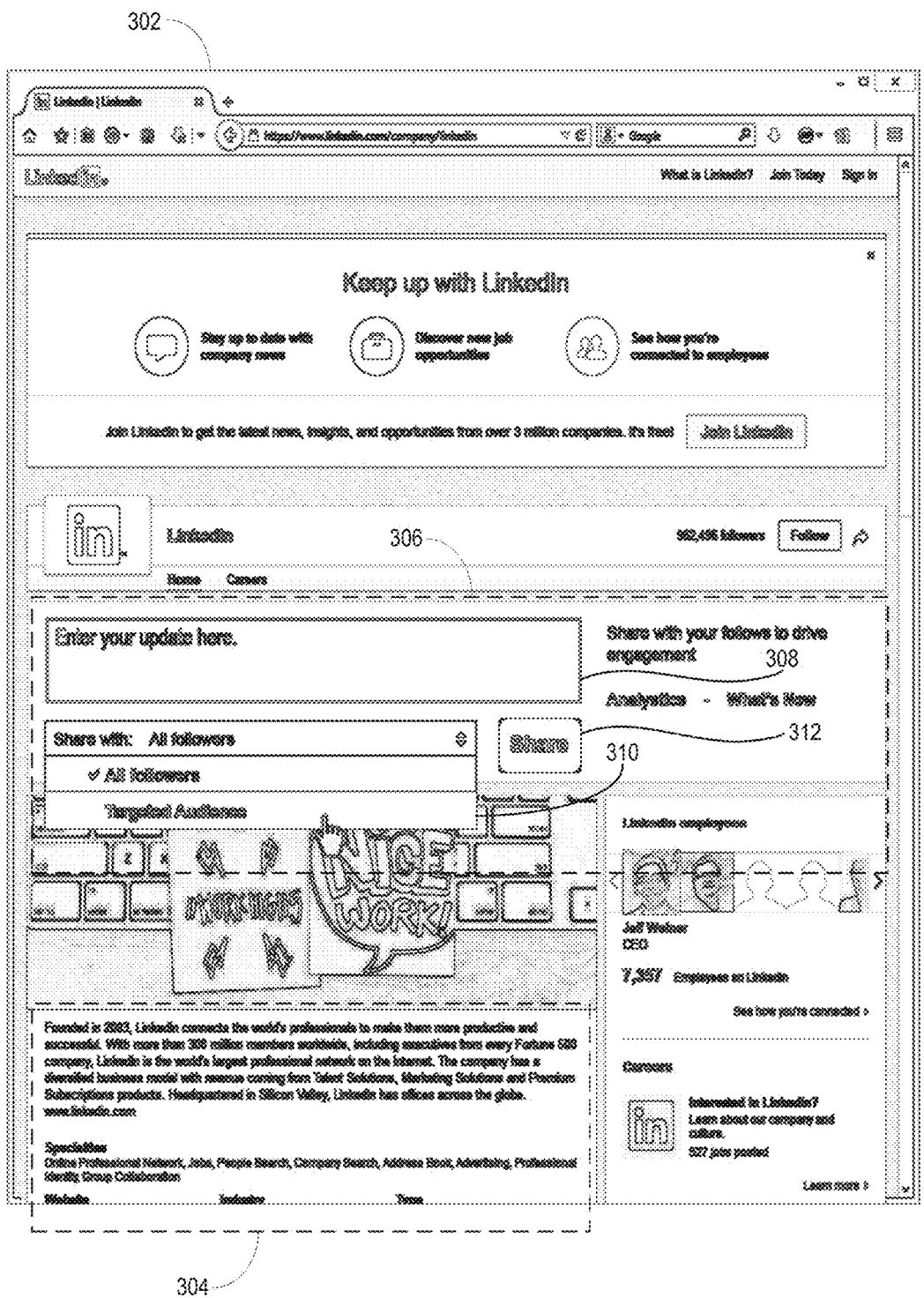
FIG. 3 illustrates a webpage for an organization, in accordance with an example embodiment, for delivering targeted updates to members of a social network service.

As discussed previously, the social network service may provide a platform for an organization to have a webpage to provide the previously described targeted updates. FIG. 3 illustrates a webpage 302 for an organization, in accordance with an example embodiment, for delivering targeted updates to members of a social network service. The webpage 302 may include various portions for conveying information about the organization associated with the webpage 302. The information may include a summary 304 of the organization (e.g., a headline), persons or members of the social network service employed by the organization, jobs available at the organization, information updates from the organization (e.g., targeted and non-targeted updates), and other such information.

The organization's webpage 302 may have multiple versions depending on whether a member of the social network service is authorized to modify the webpage 302. The version of the webpage 302 is that of an administrator, where the administrator has been authorized by the organization to add targeted and non-targeted updates via an updates interface 306. However, other versions of the webpage 302, such as a version for viewing by a non-authorized member of the social network service, may be provided where the updates interface 306 is omitted, not displayed, or is otherwise inaccessible. Other versions of the webpage 302 may also be provided (e.g., via the organization webpage engine 212), such as a mobile version, a text-only version, a web browser-specific version, or other such version.

The updates interface 306 may be configured for an administrator to provide updates via the organization's webpage 302. The updates interface 306 may include various elements, such as an updates entry element 308, a follower (subscriber) selection element 310, and a sharing element 312. The updates entry element 308 may be configured to accept information, such as text, a hyperlink, graphics, audio content, video content, or other such content. The follower selection element 310 may be include one or more choices of those members that should be able to view the update via the webpage 302. As shown in FIG. 3, the choices include "All Followers" and "Targeted Followers." When "All Followers" is selected, any member of the social network service may view the update and, in particular, any subscriber or follower of the organization. Additionally or alternatively, the choices of the follower selection element 310 may also include non-followers, non-members, or any other such type of user. The sharing element 312 may be a selectable element that informs the targeted update engine 216 that the authorized member is ready to share the configured update based on the information provided in the updates entry element 308 and the follower selection element 310. When selected, the sharing element 312 may invoke the targeted update engine 216.

The targeted update engine 216 may facilitate the configuration of a targeted update when specific followers (e.g., "Targeted Followers") are selected as the audience for the update. FIGS. 4-9 are illustrations of configuring follower dimensions 404, in accordance with an example embodiment, for a targeted update.

Figure 4:
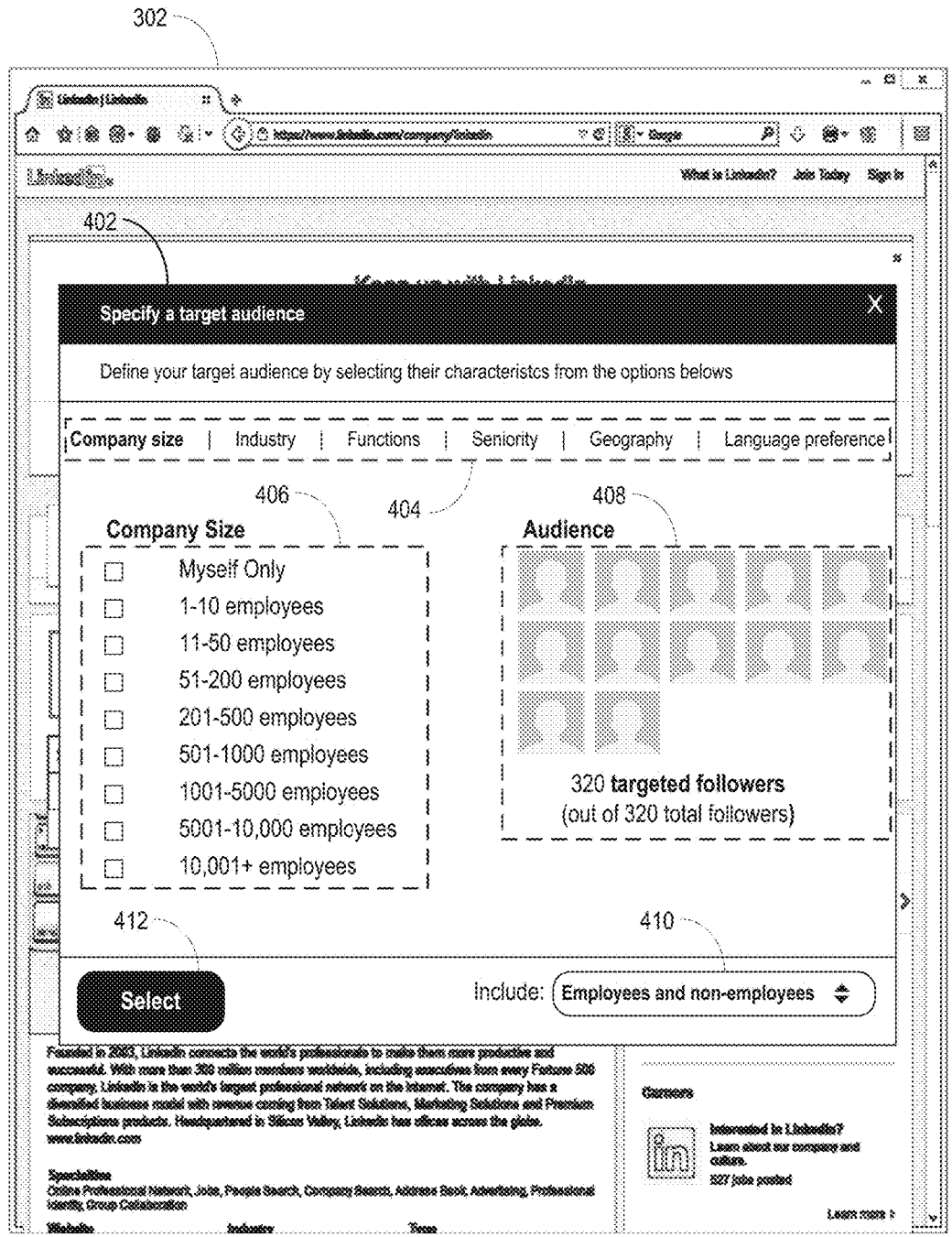
FIGS. 4-9 are illustrations of configuring follower dimensions, in accordance with an example embodiment, for a targeted update.
Figure 5:
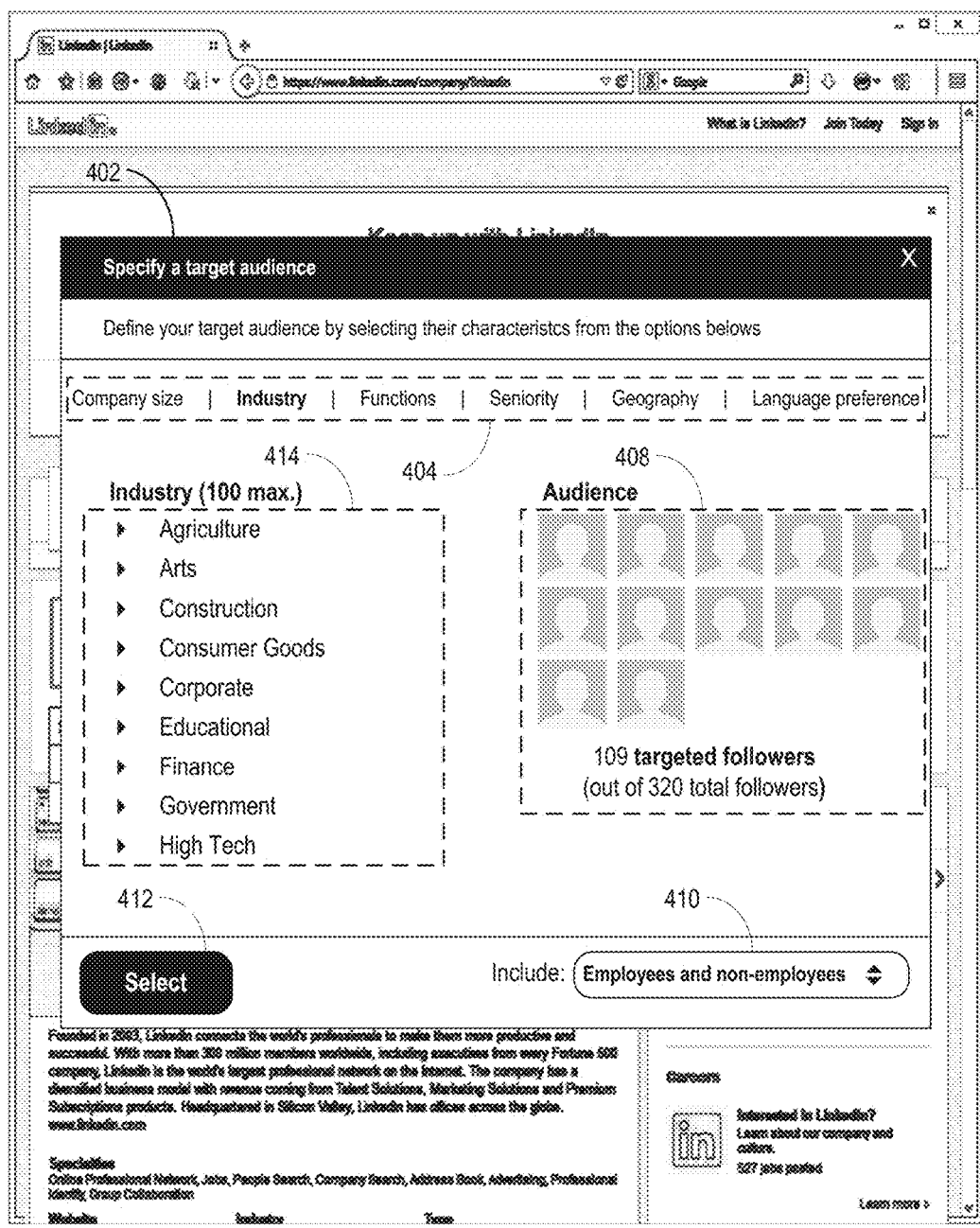
Figure 6:
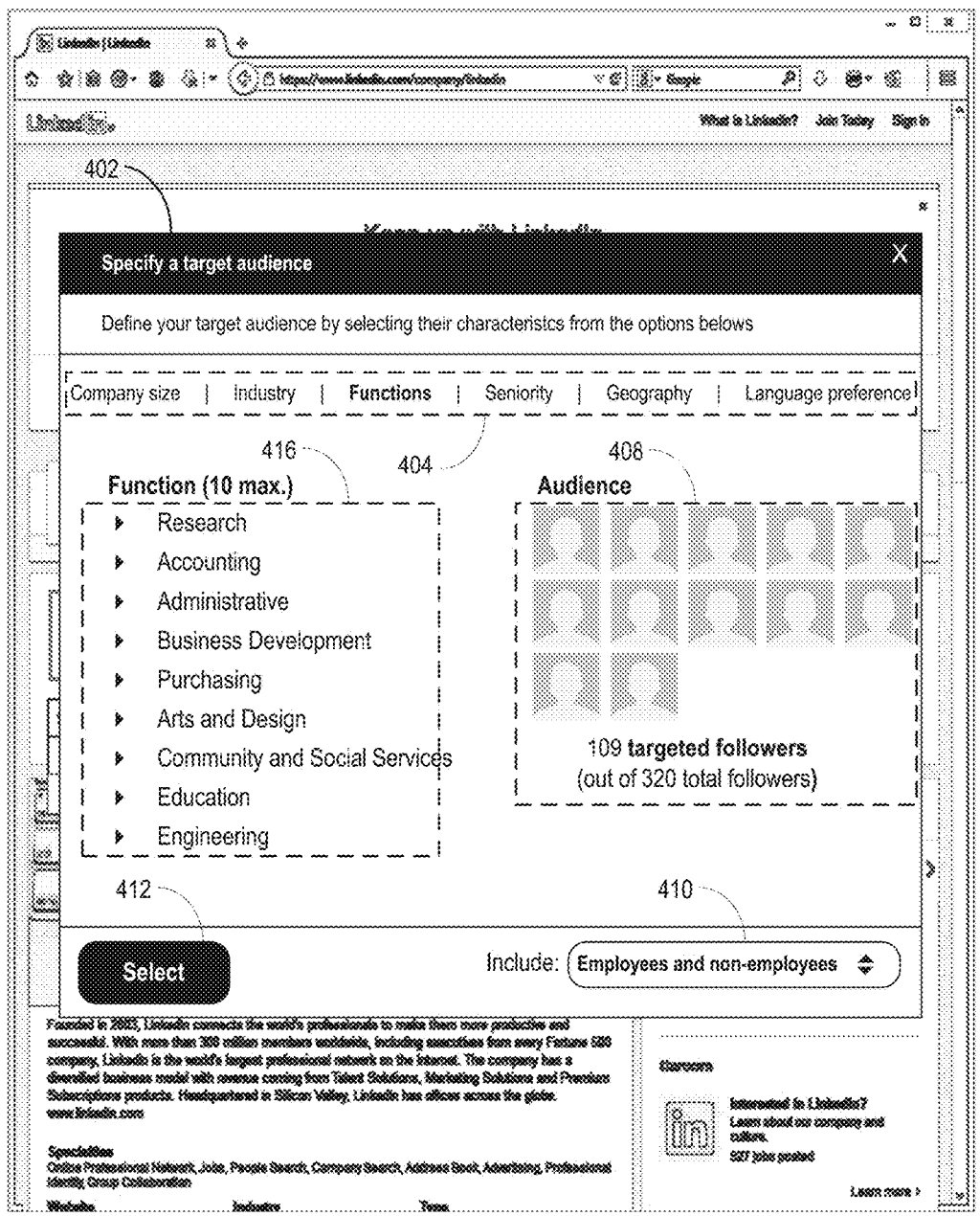
Figure 7:
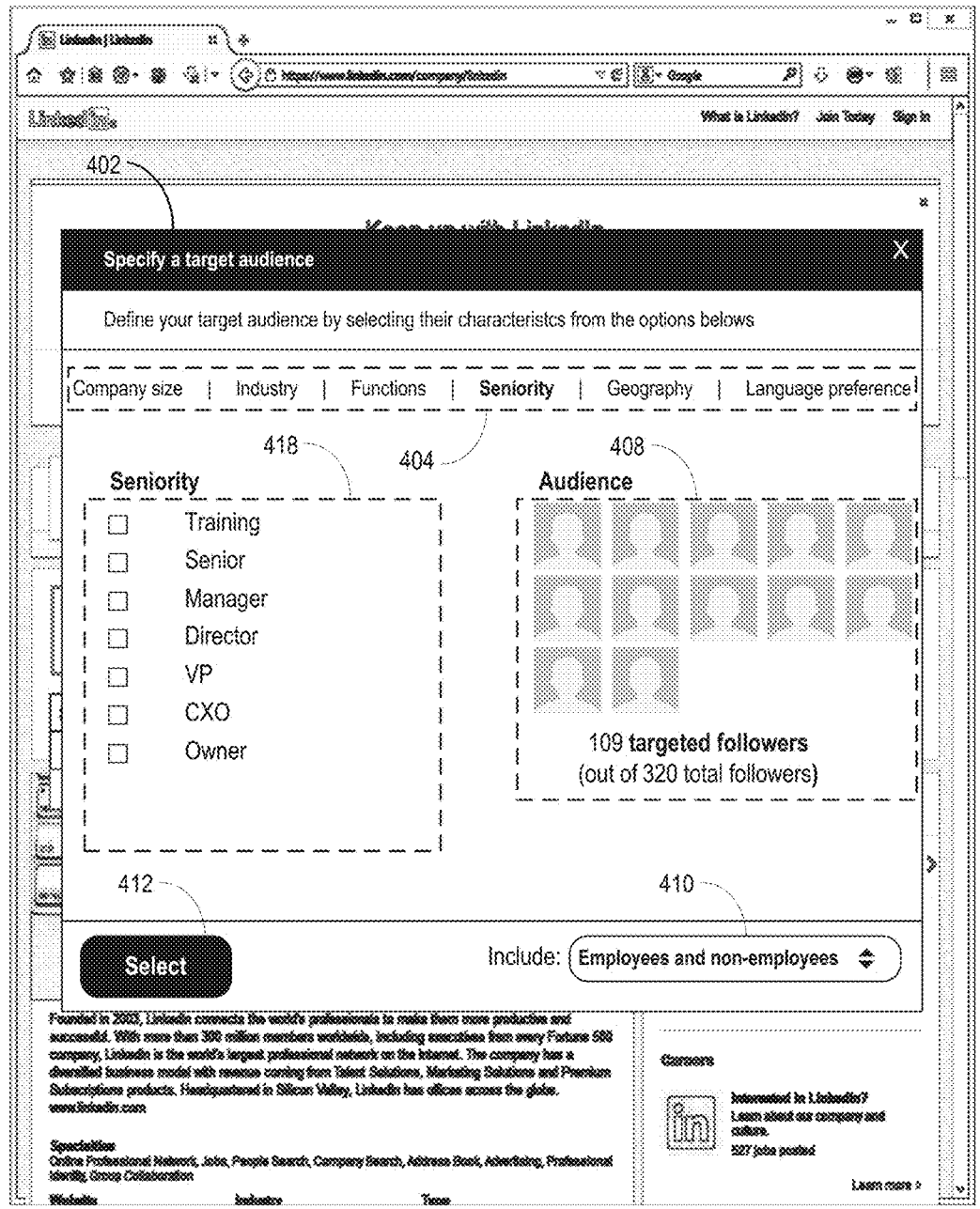
Figure 8:
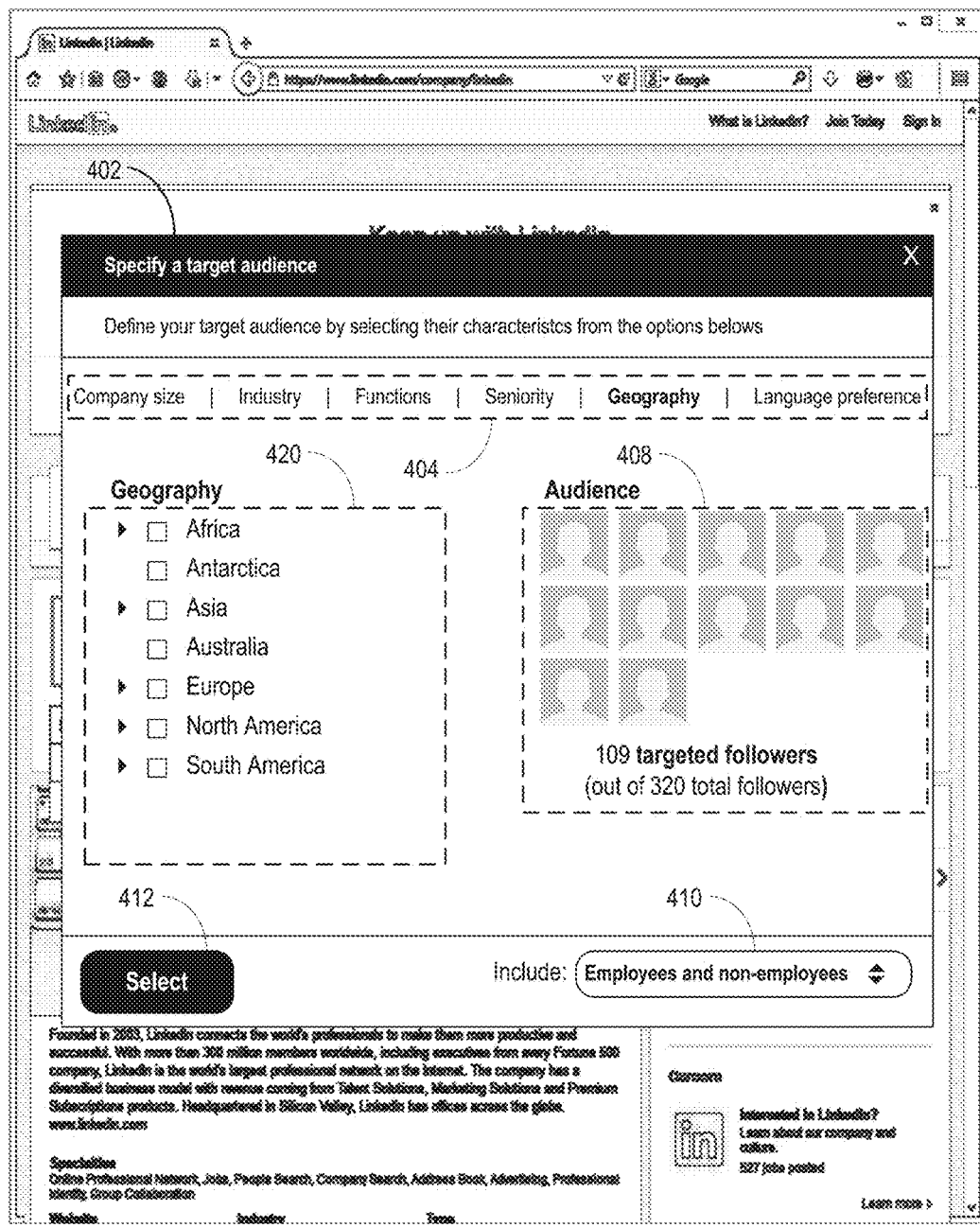
Figure 9:
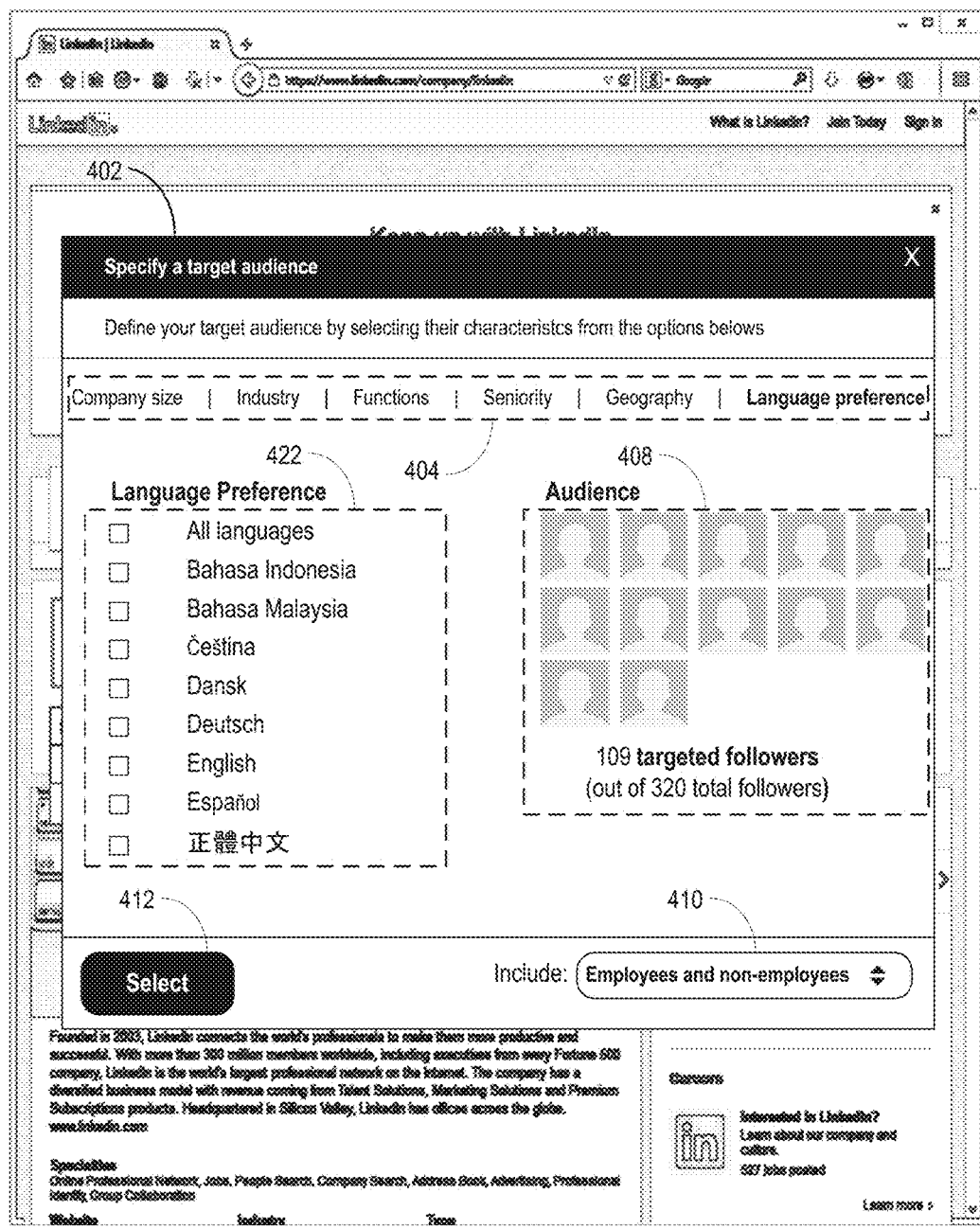

Referring to FIG. 4, the targeted update engine 216 may cause the display of a targeted audience interface 402 for specifying the audience to which the update is directed. The targeted audience interface 402 may display one or more selectable follower dimensions 404. The follower dimensions 404 may be based on member profile attributes. For example, each of the follower dimensions 404 may correspond directly (or indirectly) to a member profile attribute. A direct correspondence may include where a given follower dimension attribute has the name as a member profile attribute. An indirect correspondence may be where a given follower dimension attribute has one name (e.g., "Company Size") and the corresponding member profile attribute has another name (e.g., "Number of Employees").

In one embodiment, the follower dimensions 404 include a company size dimension, an industry dimension, a function dimension, a seniority dimension, a geography dimension, and a language preference dimension. The targeted audience interface 402 may further display one or more selectable follower dimension attributes 406 that the author of the targeted update may select. The dimension attributes specify the value of an associated follower dimension. For example, where the follower dimension is "Company Size," the follower dimension attributes may specify various sizes of a company, such as "1-10 employees," "51-200 employees," or other such attributes. The author of the targeted update may select none, one, or more of the various follower dimension attributes for a given follower dimension. When a follower dimension attribute is selected, the targeted update comparator 218 determines whether a member profile has a corresponding member profile attribute. In this way, selecting a follower dimension attribute effectively identifies the types of members that are the intended audience for a corresponding targeted update. While shown as set of check boxes, the follower dimension attributes 406 may be configured as other types of selectable elements, such as radio buttons, a drop-down menu, scrollable menus, or any other type of selectable element or combination thereof.

The target audience interface 402 may also include an audience identifier 408 that identifies potential members of the social network service that may be able to view the targeted update via the organization's webpage. As shown in FIG. 4, with no "Company Size" specified, the targeted update is configured to be displayed to 320 target followers out of 320 followers. However, as shown in FIGS. 5-9, the number of target followers may change depending on the selected follower dimension attributes.

The target audience interface 402 may further include an employee selection element 410 and a confirmation element 412. The employee selection element 410 may be used to specify whether the targeted update is to be displayed to employees, non-employees, or employees and non-employees of the organization. In this way, the author of the targeted update can control whether employees of the organization can view the targeted update. While shown as a drop-down menu, the employee selection element 410 may be configured as other types of elements, such as radio buttons, check boxes, scrollable menus, or any other type of selectable element or combination thereof.

The confirmation element 412 may be used to confirm the selected follower dimension attributes for a given targeted update. When the selection element 412 is selected, the selected follower dimension attributes 406 for each of the corresponding follower dimensions 404 may be associated with the targeted update. For example, the follower dimension attributes 406 may be stored as data 206 and retrievable by one or more of the application(s) 204, such as the targeted update comparator 218, when a determination needs to be made as to whether a given targeted update should be displayed on the organization's webpage to a given member of the social network service.

FIGS. 5-9 illustrate additional sets of follower dimension attributes 414-422 for the various follower dimensions 404. By selecting the various follower dimension attributes 406 and 414-422, the author of the targeted update can define the intended audience of the targeted update. Although FIGS. 4-9 illustrate the follower dimensions 404 may include six types of follower dimensions, it should be understood that more or less follower dimensions 404 may be implemented without departing from the scope and intent of the disclosed systems and methods.

Figure 10:
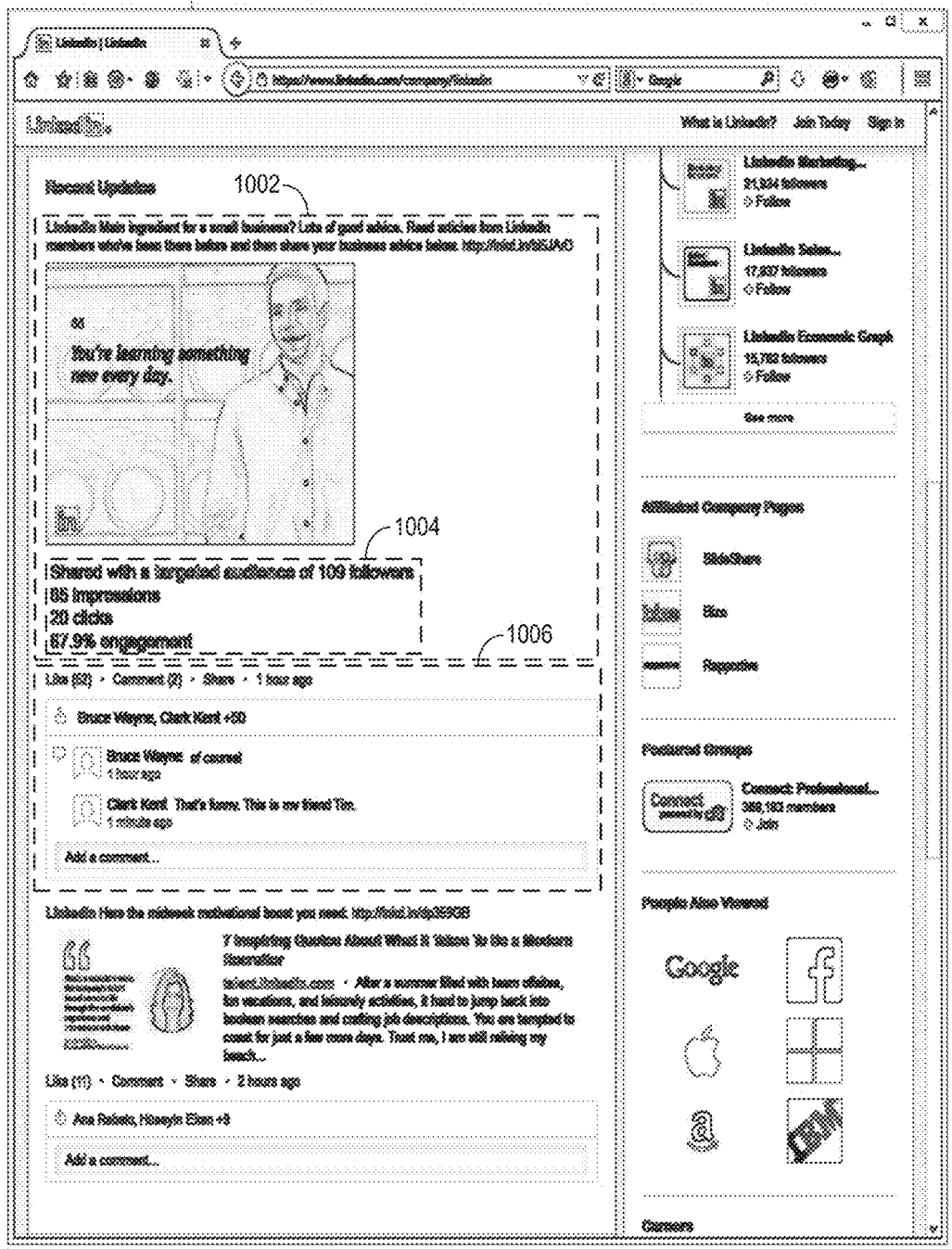
FIG. 10 is an illustration of the webpage of the organization, in accordance with an example embodiment, displaying the targeted update configured in FIGS. 4-9.

After a targeted update is configured and deployed (e.g., viewable to members of the intended audience), a member of the organization may view various performance metrics of the targeted update. FIG. 10 is an illustration of the webpage 302 of the organization, in accordance with an example embodiment, displaying the targeted update 1002 configured in FIGS. 4-9. As shown in FIG. 10, the targeted update 1002 is being displayed in accordance with an authorized member of the organization having accessed the webpage 302. In one embodiment, various metrics 1004 are also displayed with the targeted update 1002. As discussed previously, the targeted update engine 216 may be configured to monitor and/or record metrics 1004 associated with the targeted update 1002 to determine the effectiveness of the update. The metrics 1004 may include, but are not limited to, the number of members that were served the targeted update (e.g., impressions), the number of times members selected (e.g., clicked) the targeted update, the number of times members indicated approval or agreement (e.g., "liked") the targeted update, the number of comments received for the targeted update, and other such metrics. The targeted update engine 216 may further determine an effectiveness rating (e.g., an engagement percentage) for the targeted update that indicates a percentage or number of users that performed an action in response to the targeted update (e.g., viewed, clicked, commented, liked, etc.). The organization may use an effectiveness rating to help shape further targeted updates or to help gauge the amount of interest members of the social network service have in the organization.

The display of the targeted update 1002 may also include an interaction portion 1006 that indicates various interactions with the targeted update among members of the social network service. The interactions may include those members that agree with targeted update (e.g., "Liked" the update), members that have commented on the targeted update, and other such interactions. The interaction portion 1006 may further include selectable elements that allow the authorized member of the organization viewing the targeted update to also interact with the targeted update (e.g., "Like," "Comment," "Share," etc.).

Figure 11:
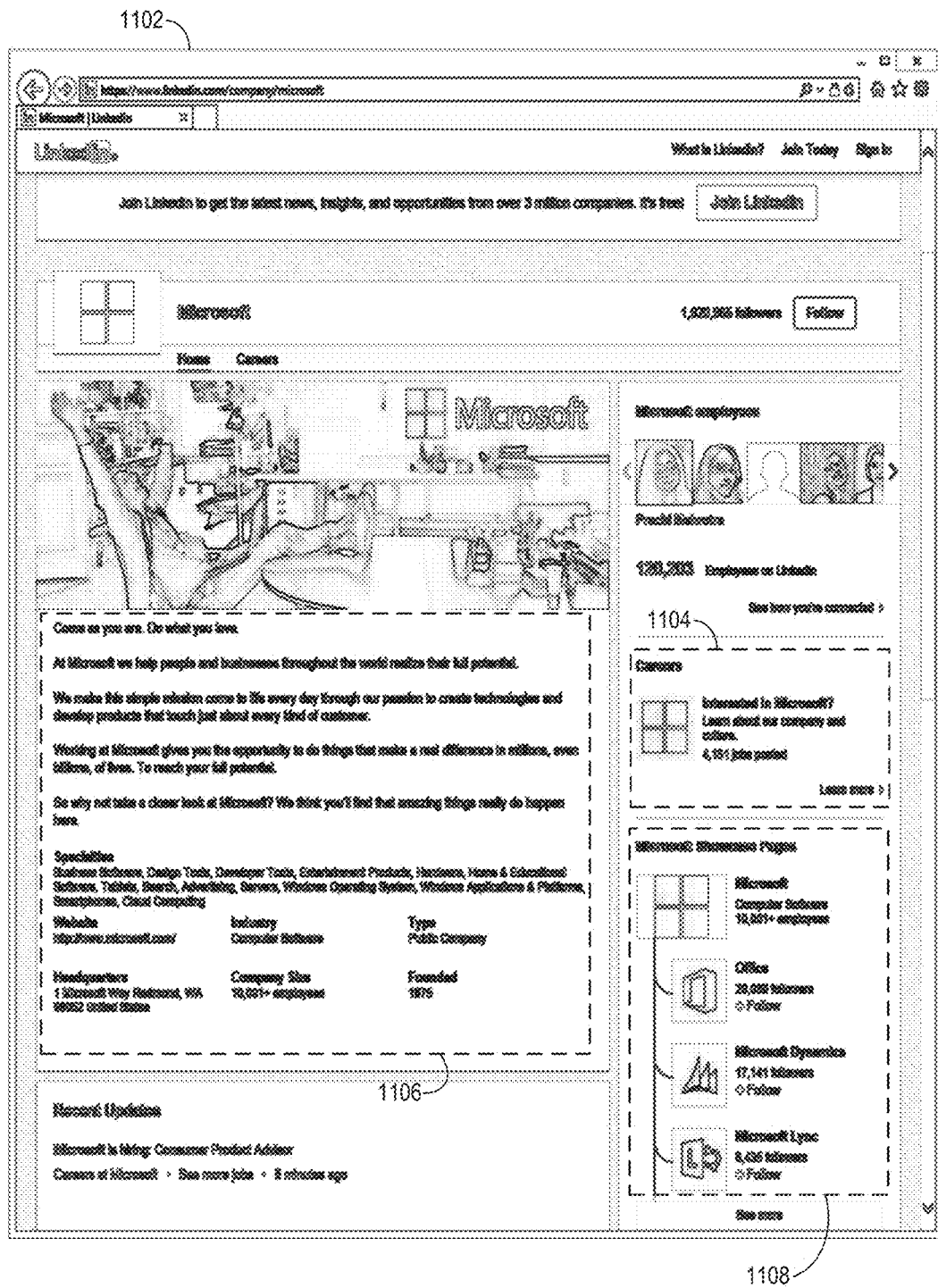
FIG. 11 is an illustration of another webpage of an organization, in accordance with an example embodiment, having configurable elements that are selectively displayable to members of the social network service.

Although a targeted update may be directed to an intended portion of the members of the social network service, other elements of a webpage of an organization may also be directed to specific types of members of the social network service. FIG. 11 is an illustration of another webpage 1102 of an organization, in accordance with an example embodiment, having configurable elements 1104-1108 that are selectively displayable to members of the social network service. In one embodiment, each of the elements 1104-1108 may be configurable such one or more follower dimension attributes are associated with each of the elements 1104-1108. The elements 1104-1108 may include portions of the webpage 1102, such as the careers portion 1104 or the showcase portion 1108, or rendered portions, such as text 1106. The rendered portions may further include graphics, audio, video, or other such rendered portions.

The substance of the configurable element 1104-1108 that is displayed may be based on the follower dimension attributes associated with it. For example, the text 1106 may be written in several different languages (e.g., English, Spanish, Chinese, etc.), and the language displayed to a member of the social network service may be based on a language member profile attribute of the member's profile. Thus, a member having a member profile language attribute of "English" may be displayed English language text whereas a member having a member profile language attribute of "Chinese" may be displayed Chinese language text.

As another example, the available jobs displayed in the careers portion 1104 may be based on a geographic location attribute. Thus, a member having a member profile geographic location attribute of "North America" may be shown jobs available in North America whereas a member having a member profile geographic location attribute of "Europe" may be shown jobs available in Europe. In other embodiments, the geographic location attribute may be more specific (e.g., based on a city, state, country, etc.) or the careers portion 1104 may be associated with different attributes or sets of attributes (e.g., a function attribute, an industry attribute, etc.).

In this manner, the webpage 1102 of the organization may be truly configurable while retaining its overall appearance. Thus, members of the social network service who visit the webpage 1102 from different locations or having different job functions may be shown similar webpages but where the substance of the webpage 1102 is tailored to the specifics of the member. This configurability is also beneficial to the organization because it allows the organization to tailor the webpage's content for specific audiences, which helps it increase overall interest in the organization or to target specific demographics where increased visibility is desired. The technologies involved to facilitate this configurability include, but is not limited to, database management, network communications, server-side scripting and client-side scripting, and other such dynamic webpage technologies.

Figure 12A:
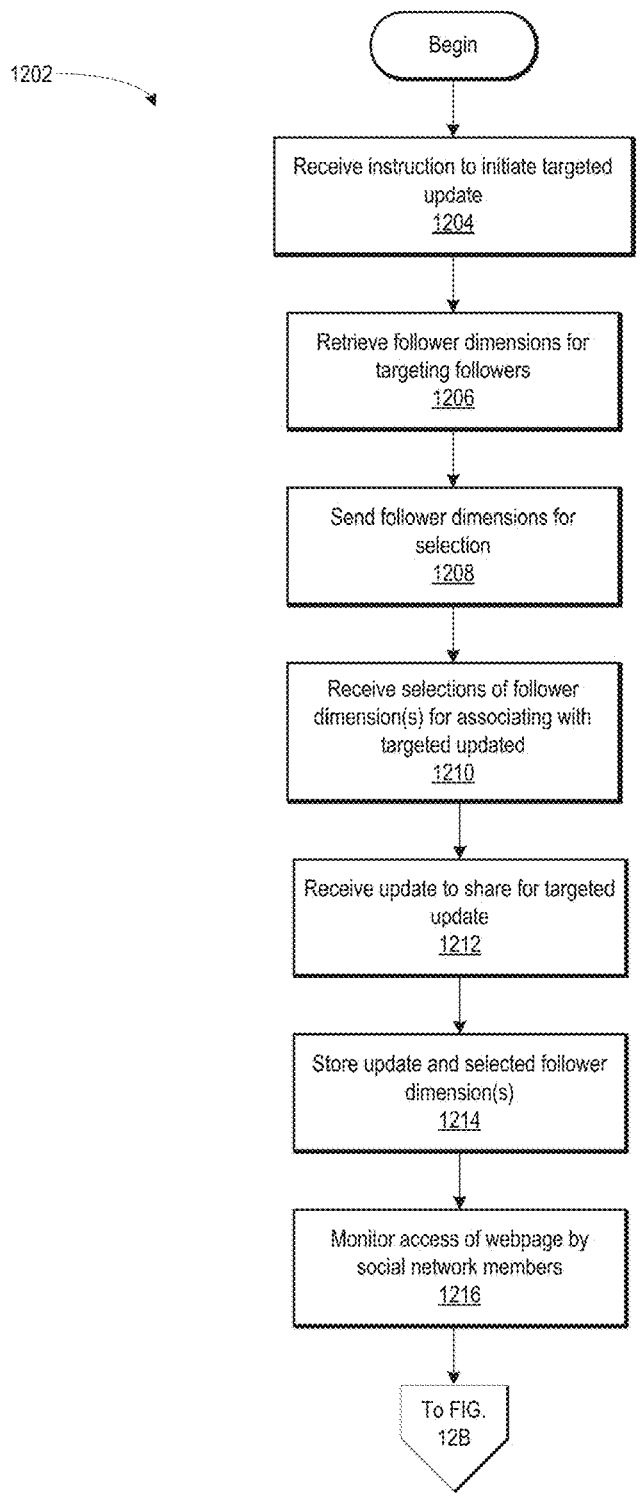
FIGS. 12A-12C illustrate a method, in accordance with an example embodiment, for configuring and providing a targeted update.
Figure 12B:
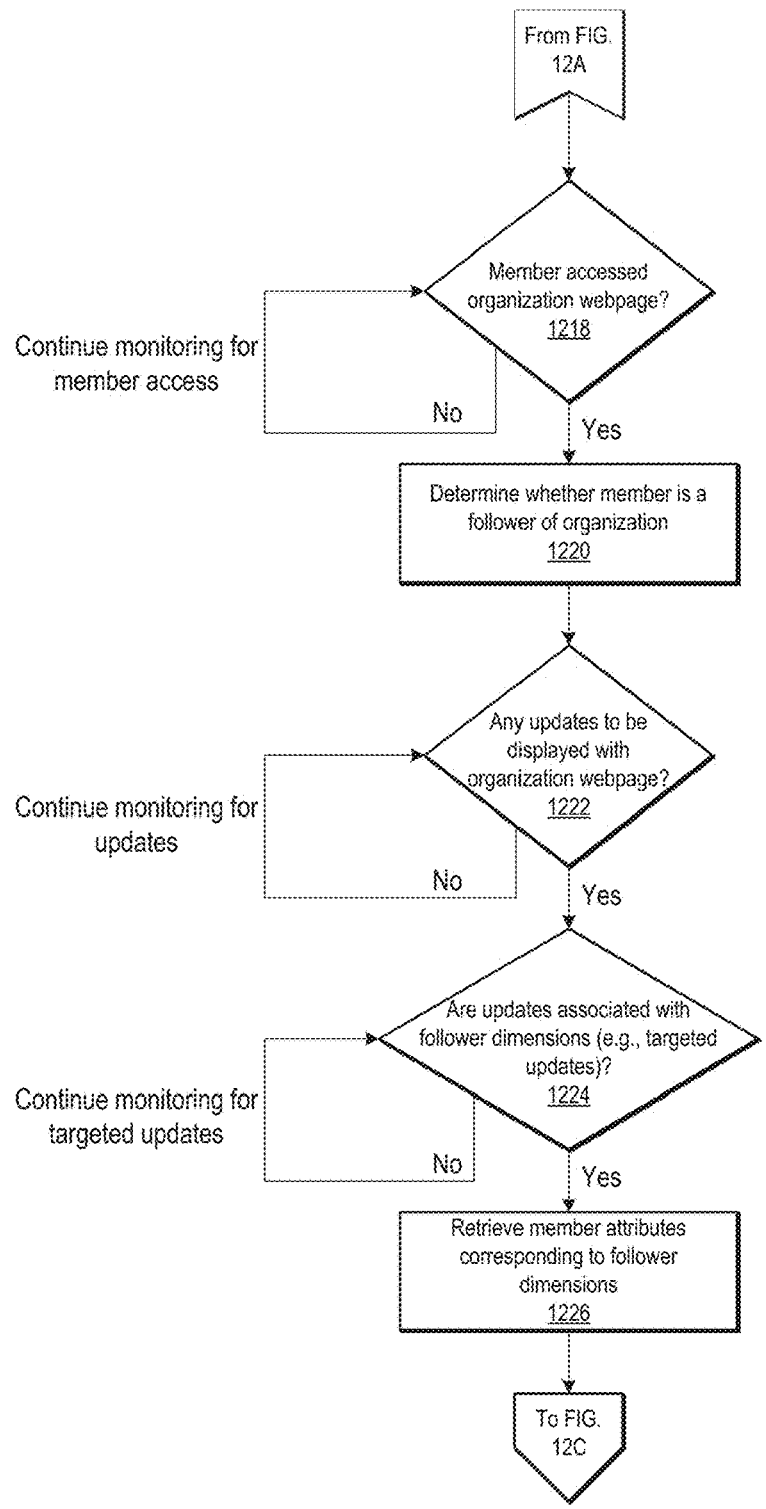
Figure 12C:
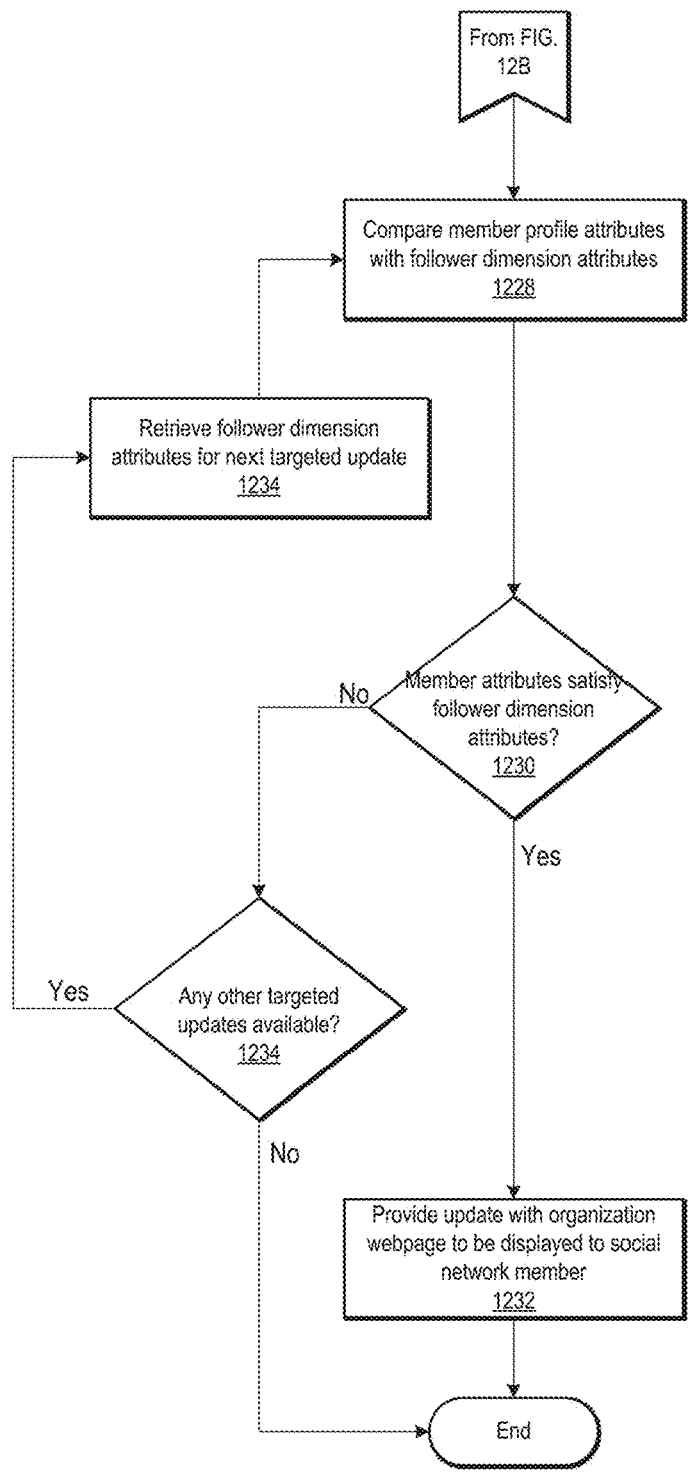

FIGS. 12A-12C illustrate a method 1202, in accordance with an example embodiment, for configuring and providing a targeted update. The method 1202 may be implemented on the social networking server 104 and, accordingly, is merely described by way of reference thereto. With reference to FIG. 2, the social networking server 104 may initially receive an instruction to initiate a targeted update, such as via the targeted update interface 306 (Operation 1204). One or more applications of the social networking server 104, such as the targeted update engine 216, may then retrieve one or more follower dimensions (and their associated attributes) used to configured the targeted update (Operation 1206). The follower dimensions may then be provided to the member configuring the targeted update (Operation 1208). After the member has configured the targeted update along the various follower dimensions, the social networking server 104 may then receive the member's selection of the attributes associated with the various follower dimensions (Operation 1210). The social networking server 104 may further receive the update to be shared among members of the social network service targeted by the targeted update (Operation 1212). Thereafter, the social networking server 104 may then store the targeted update and one or more associations with the selected follower dimension attributes (Operation 1214). As discussed below, these associations may be used to determine whether a given member of the social networking service will be shown the targeted update.

The social networking server 104 may then monitor for requests or accesses to the organization's webpage (Operation 1216). As the social network service may be accessible by any user with a computer device (e.g., with limited functionality or a preview of the available content offered by the social network service), the social networking server 104 may determine whether the requesting user is a member of the social network service (Operation 1218). Where the user is also a member of the social network service, the social networking server 104 may then continue in its determination of whether the member should be shown the targeted update. If the user is not a member of the social network service, the social networking server 104 may determine that the targeted updated is not to be displayed to the user requesting the organization's webpage. In another embodiment, the user may be provided with the targeted update for display with the organization's webpage even if the user is not a member of the social network service.

If the requesting user is a member, the social networking server 104 may then determine whether the member is also a follower (e.g., a subscriber) of the organization (Operation 1220). In some embodiments, a targeted update may be directed to subscribers only, non-subscribers only, or a combination of subscribers and non-subscribers. The social networking server 104 may then determine whether there are any updates, targeted or non-targeted, to be displayed via the organization's webpage (Operation 1222). In some embodiments, the determination of whether there are any updates to be displayed may be based on a time threshold, e.g., the organization's webpage should display any updates made within the last two hours, the last 24 hours, etc. In other embodiments, the determination of whether there are any updates to be displayed may be based on a numerosity threshold, e.g., the organization's webpage should display the most recent 10 updates or the most recent 1% of all updates. If there are no updates to display meeting any configured threshold, the social networking server 104 may simply display the organization's webpage without any updates, and continue to monitor for such updates.

However, if there are updates available for display via the organization's webpage, the social networking server 104 may determine whether such updates are associated with one or more follower dimensions (Operation 1224). In other words, the social networking server 104 may determine whether any of the available updates are targeted updates. If not, the social networking server 104 may continue the sending of the organization's webpage without the targeted updates.

However, if targeted updates are available for inclusion in the organization's webpage, the social networking server 104 may then retrieve the requesting member's profile and/or one or more member profile attributes. In particular, the social networking server 104 may retrieve those profile attributes that correspond to the follower dimensions configured for the targeted update (Operation 1226). As discussed previously, there may be a direct or indirect correspondence between the member profile attributes and the follower dimensions.

To determine whether the member requesting the organization's webpage should be shown the targeted update, the social networking server 104 may compare the member profile attributes with the follower dimension attributes associated with the targeted update (Operation 1228). If the member attributes satisfy the follower dimension attributes (Operation 1230), the social networking server 104 may provide the targeted update with the organization's webpage for display to the requesting member (Operation 1232). In one embodiment, each of the follower dimensions must be satisfied for the targeted update to be provided (e.g., the comparison is a Boolean AND operation). In another embodiment, only one of the follower dimensions must be satisfied (e.g., the comparison is a Boolean OR operation). In further embodiments, selected ones of the follower dimensions must be satisfied (e.g., the follower dimensions include "Company Size," "Function," and "Industry," but only "Company Size" and "Function" need to be satisfied for the targeted update to be displayed to the requesting member). Combinations of the foregoing are also possible.

Should the member profile attributes be unable to satisfy the follower dimension attributes associated with the targeted update, the social networking server 104 may then determine whether there are other remaining targeted updates to provide (Operation 1234). If not, then the method 1202 may finish. If there are remaining targeted updates, the social networking server 104 may retrieve the follower dimension attributes for the next targeted update to provide (Operation 1234). Additionally, or alternatively, the social networking server 104 may also provide any non-targeted updates. At which point, the social networking server 104 may proceed to Operation 1228 and continue through Operations 1230-1234.

Figure 13:
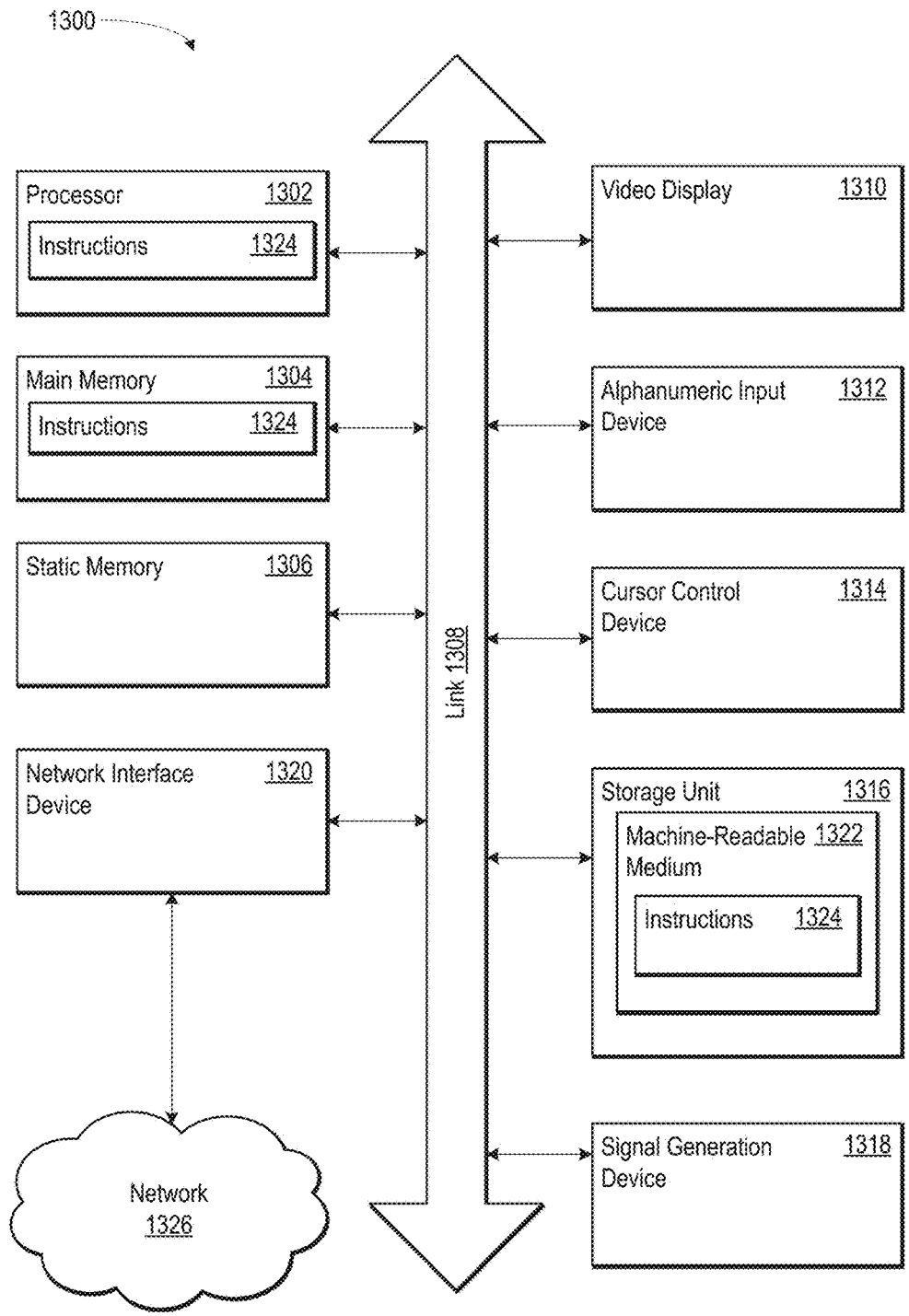
FIG. 13 is a block diagram illustrating components of a machine, in accordance with an example embodiment, configured to read instructions from a machine-readable medium.

FIG. 13 is a block diagram illustrating components of a machine 1300, in accordance with an example embodiment, configured to read instructions from a machine-readable medium (e.g., a machine-readable storage medium) and perform any one or more of the methodologies discussed herein. Specifically, FIG. 13 shows a diagrammatic representation of the machine 1300 in the example form of a computer system and within which instructions 1324 (e.g., software) for causing the machine 1300 to perform any one or more of the methodologies discussed herein may be executed. In alternative examples, the machine 1300 operates as a standalone device or may be connected (e.g., networked) to other machines. In a networked deployment, the machine 1300 may operate in the capacity of a server machine or a client machine in a server-client network environment, or as a peer machine in a peer-to-peer (or distributed) network environment. The machine 1300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The machine 1300 may further include a video display 1310

(e.g., a plasma display panel (PDP), a light emitting diode (LED) display, a liquid crystal display (LCD), a projector, or a cathode ray tube (CRT)). The machine 1300 may also include an alphanumeric input device 1312 (e.g., a keyboard), a cursor control device 1314 (e.g., a mouse, a touchpad, a trackball, a joystick, a motion sensor, or other pointing instrument), a storage unit 1316, a signal generation device 1318 (e.g., a speaker), and a network interface device 1320.

The storage unit 1316 includes a machine-readable medium 1322 on which is stored the instructions 1324 (e.g., software) embodying any one or more of the methodologies or functions described herein. The instructions 1324 may also reside, completely or at least partially, within the main memory 1304, within the processor 1302 (e.g., within the processor's cache memory), or both, during execution thereof by the machine 1300. Accordingly, the main memory 1304 and the processor 1302 may be considered as machine-readable media. The instructions 1324 may be transmitted or received over a network 1326 via the network interface device 1320.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1300), such that the instructions, when executed by one or more processors of the machine (e.g., processor 1302), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A system for providing targeted updates about an organization to members of a social networking service, the system comprising:
a machine-readable memory storing computer-executable instructions; and
one or more hardware processors in communication with the machine-readable memory that, having executed the computer-executable instructions, configures the system to:
provide a first webpage for an organization being followed by a plurality of members of a social networking service, wherein the first webpage includes:
an updates interface having an updates entry element configured to receive an update to be displayed on a second webpage, wherein:
the second webpage comprises a configured version of the first webpage that includes at least one displayable portion in common with the first webpage and omits one or more elements displayable by the first webpage; and
a follower selection element configured to display:
a first selection value corresponding to the plurality of members; and
a second selection value corresponding to a targeted set of the plurality of members;
based on a selection of the first selection value:
update the second webpage with a first update received in the updates entry element, the first update being visible to the plurality members that request the second webpage; and
provide the second webpage with the first update; and
based on a selection of the second selection value:
display a target audience interface that includes a plurality of follower dimensions, each follower dimension having a plurality of follower dimension attributes;
associate a selection of one or more of the follower dimensions with a second update received in the updates entry element;
update the second webpage with the second update, wherein the second update is visible to the targeted set of the plurality of members that have member profile attributes satisfying each of the selected follower dimensions; and
provide the second webpage with the second update.

2. The system of claim 1, wherein the follower dimensions of the second update include a company size dimension identifying a company size, an industry dimension identifying an industry, and a functions dimension identifying a function performed by a member of the social network service.

3. The system of claim 1, wherein:
the second update is selected from a plurality of updates; and
the follower dimension attributes of the selected second update are different from another set of follower dimension attributes for a third update selectable from the plurality of targeted updates.

4. The system of claim 1, wherein at least one follower dimension attribute associated with the second update indicates whether the second update is visible to members of the organization.

5. The system of claim 1, wherein the system is further configured to:

establish a configurable element of the first webpage of the organization, wherein the configurable element is associated with a plurality of selectively displayable versions of the configurable element, each version depending on the member attributes of the member profile; and provide a selected version of the plurality of selectively displayable versions of the configurable element for display within the second webpage, the selected version being selected based on at least one member attribute.

6. The system of claim 5, wherein the configurable element of the first webpage of the organization comprises a defined portion of the first webpage.

7. The system of claim 1, wherein the target audience interface further includes an audience identifier that identifies a number of members of the targeted set of the plurality of members that are able to view the second update.

8. A method for providing targeted updates about an organization to members of a social networking service, the method comprising:

providing a first webpage for an organization being followed by a plurality of members of a social networking service, wherein the first webpage includes:

an updates interface having an updates entry element configured to receive an update to be displayed on a second webpage, wherein:

the second webpage comprises a configured version of the first webpage that includes at least one displayable portion in common with the first webpage and omits one or more elements displayable by the first webpage; and a follower selection element configured to display:

a first selection value corresponding to the plurality of members; and a second selection value corresponding to a targeted set of the plurality of members;

based on a selection of the first selection value:

updating the second webpage with a first update received in the updates entry element, the first update being visible to the plurality members that request the second webpage; and providing the second webpage with the first update; and based on a selection of the second selection value:

displaying a target audience interface that includes a plurality of follower dimensions, each follower dimension having a plurality of follower dimension attributes;

associating a selection of one or more of the follower dimensions with a second update received in the updates entry element;

updating the second webpage with the second update, wherein the second update is visible to the targeted set of the plurality of members that have member profile attributes satisfying each of the selected follower dimensions; and providing the second webpage with the second update.

9. The method of claim 8, wherein the follower dimensions of the second update include a company size dimension identifying a company size, an industry dimension identifying an industry, and a functions dimension identifying a function performed by a member of the social network service.

10. The method of claim 8, wherein:

the second update is selected from a plurality of updates; and the follower dimension attributes of the selected second update are different from another set of follower dimension attributes for a third update selectable from the plurality of targeted updates.

11. The method of claim 8, wherein at least one follower dimension attribute associated with the second update indicates whether the second update is visible to members of the organization.

12. The method of claim 8, further comprising:

establishing a configurable element of the first webpage of the organization, wherein the configurable element is associated with a plurality of selectively displayable versions of the configurable element, each version depending on the member attributes of the member profile; and providing a selected version of the plurality of selectively displayable versions of the configurable element for display within the second webpage, the selected version being selected based on at least one member attribute.

13. The method of claim 12, wherein the configurable element of the first webpage of the organization comprises a defined portion of the first webpage.

14. The method of claim 8, wherein the target audience interface further includes an audience identifier that identifies a number of members of the targeted set of the plurality of members that are able to view the second update.

15. A non-transitory, computer-readable medium having computer-executable instructions stored thereon that, when executed by one or more hardware processors, cause a system to perform a plurality of operations comprising:

providing a first webpage for an organization being followed by a plurality of members of a social networking service, wherein the first webpage includes:

an updates interface having an updates entry element configured to receive an update to be displayed on a second webpage, wherein:

the second webpage comprises a configured version of the first webpage that includes at least one displayable portion in common with the first webpage and omits one or more elements displayable by the first webpage; and a follower selection element configured to display:

a first selection value corresponding to the plurality of members; and a second selection value corresponding to a targeted set of the plurality of members;

based on a selection of the first selection value:

updating the second webpage with a first update received in the updates entry element, the first update being visible to the plurality members that request the second webpage; and providing the second webpage with the first update; and based on a selection of the second selection value:

displaying a target audience interface that includes a plurality of follower dimensions, each follower dimension having a plurality of follower dimension attributes;

associating a selection of one or more of the follower dimensions with a second update received in the updates entry element;

updating the second webpage with the second update, wherein the second update is visible to the targeted set of the plurality of members that have member profile attributes satisfying each of the selected follower dimensions; and providing the second webpage with the second update.

16. The non-transitory, computer-readable medium of claim 15, wherein the follower dimensions of the second update include a company size dimension identifying a company size, an industry dimension identifying an industry, and a functions dimension identifying a function performed by a member of the social network service.

17. The non-transitory, computer-readable medium of claim 15, wherein:

the second update is selected from a plurality of updates; and the follower dimension attributes of the selected second update are different from another set of follower dimension attributes for a third update selectable from the plurality of targeted updates.

18. The non-transitory, computer-readable medium of claim 15, wherein at least one follower dimension attribute associated with the second update indicates whether the second update is visible to members of the organization.

19. The non-transitory, computer-readable medium of claim 15, wherein the plurality of operations further comprise:

establishing a configurable element of the first webpage of the organization, wherein the configurable element is associated with a plurality of selectively displayable versions of the configurable element, each version depending on the member attributes of the member profile; and providing a selected version of the plurality of selectively displayable versions of the configurable element for display within the second webpage, the selected version being selected based on at least one member attribute.

20. The non-transitory, computer-readable medium of claim 15, wherein the target audience interface further includes an audience identifier that identifies a number of members of the targeted set of the plurality of members that are able to view the second update.

\* \* \* \* \*

UNITED STATES PATENT AND TRADEMARK OFFICE
CERTIFICATE OF CORRECTION

PATENT NO. : 10,284,680 B2
APPLICATION NO. : 15/707867
DATED : May 7, 2019
INVENTOR(S) : Pinkovezky et al.

It is certified that error appears in the above-identified patent and that said Letters Patent is hereby corrected as shown below:

On the Title Page

In Column 2, under "Other Publications", Line 1, delete "Imrpove" and insert --Improve-- therefor Signed and Sealed this
Twenty-eighth Day of April, 2020

Andrei Iancu
*Director of the United States Patent and Trademark Office*